United States Patent
Sakai et al.

(10) Patent No.: US 6,673,143 B2
(45) Date of Patent: Jan. 6, 2004

(54) AQUEOUS SLURRY OF RARE EARTH HYDROXIDE PARTICLES

(75) Inventors: Shigeru Sakai, Fukui-ken (JP); Yuji Kimura, Fukui-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/809,266

(22) Filed: Mar. 16, 2001

(65) Prior Publication Data

US 2001/0025003 A1 Sep. 27, 2001

(30) Foreign Application Priority Data

Mar. 23, 2000 (JP) ........................................ 2000-081667

(51) Int. Cl.[7] .......................... C04B 14/00; C01F 17/00
(52) U.S. Cl. ...................... 106/401; 423/21.1; 423/263; 501/152
(58) Field of Search ................... 501/152; 106/286.1, 106/401; 264/125; 423/21.1, 263

(56) References Cited

U.S. PATENT DOCUMENTS 6,171,572 B1 * 1/2001 Aozasa
6,238,469 B1 * 5/2001 Ronay .......................... 106/3

* cited by examiner

Primary Examiner—Christopher A. Fiorilla
(74) Attorney, Agent, or Firm—Wenderoth, Lind & Ponack, L.L.P.

(57) ABSTRACT

An aqueous slurry of rare earth hydroxide particles which is particularly suitable for use as a sintering aid of a ceramic powder such as silicon nitride. The aqueous slurry, which is characterized by the very small average diameter of the primary particles and a low electric conductivity as well as outstandingly high stability against settling of the particles, can be prepared by a process comprising the steps of: (a) precipitating rare earth hydroxide particles by mixing aqueous solutions of a rare earth compound, e.g., nitrate, and a basic compound, e.g., ammonia, preferably, in the presence of a surface active agent; (b) collecting the precipitates to give a cake; (c) washing the cake with deionized water until the electric conductivity of the washing has decreased to 3 mS/cm or lower; and (d) re-dispersing the thus washed cake in deionized water.

11 Claims, 2 Drawing Sheets

AQUEOUS SLURRY OF RARE EARTH HYDROXIDE PARTICLES

BACKGROUND OF THE INVENTION

The present invention relates to a novel aqueous slurry of rare earth hydroxide particles and to a method for the preparation thereof. More particularly, the invention relates to an aqueous slurry of rare earth hydroxide particles which can be used as a sintering aid or an additive in the preparation of a sintered ceramic body as well as to a method for the preparation of the slurry.

As is well known, certain rare earth compounds are used as a sintering aid or an additive ingredient in the preparation of various kinds of sintered ceramic bodies. When to be used in such applications, the particles of the rare earth compound are required to satisfy various requirements including not only fineness of the particle size but also good sintering behavior, high reactivity with other ingredients of the ceramic composition, excellent dispersibility in ceramic blend for sintering, and so on. In this regard of satisfying various requirements, the most widely employed rare earth compound in the ceramic preparation is a rare earth oxide in the form of a fine powder, which is prepared by several methods known in the art. For example, fine particles of an oxidatively decomposable compound of a rare earth element such as oxalates, carbonates and hydroxides are precipitated in a solution of a soluble rare earth compound and the precipitates are collected and calcined in an oxidizing atmosphere to be converted into a rare earth oxide powder. Alternatively, fine particles of a rare earth oxide can be prepared by grinding relatively coarse oxide particles in a suitable grinding machine. The rare earth oxide particles prepared by these typical prior art methods, however, are not always very satisfactory relative to the particle size because the average particle diameter of the oxide particles obtained by these methods can rarely be smaller than about 1 $\mu$m. Accordingly, it is desired in recent years to prepare particles of a rare earth compound having a finer and finer particle size in order to comply with the trend of the powdery compositions as the principal ingredient of the ceramic formulation toward a finer and finer particle size.

SUMMARY OF THE INVENTION

The present invention accordingly has an object, in view of the above described problems and disadvantages relative to powders of a rare earth compound, to provide particles of a rare earth compound or, in particular, rare earth hydroxide having an extremely small diameter of primary particles not exceeding 150 nm in the form of an aqueous slurry or dispersion in which the particles are little subject to settling with good dispersibility and stability as well as a method for the preparation thereof.

Thus, the present invention provides an aqueous slurry of rare earth hydroxide particles which comprises: a powder of a rare earth hydroxide of which the primary particles have a diameter not exceeding 150 nm; and water as the dispersion medium of the rare earth hydroxide particles, and which has an electric conductivity not exceeding 2 mS/cm.

The method of the present invention for the preparation of the above defined aqueous slurry of particles of a rare earth hydroxide comprises the steps of:

(a) mixing a first aqueous solution of a rare earth compound and a second aqueous solution of a basic compound, if necessary, in the presence of a surface active agent to precipitate rare earth hydroxide particles in an aqueous medium;

(b) collecting the rare earth hydroxide particles by separating from the aqueous medium to give a cake of the rare earth hydroxide particles;

(c) repeatedly washing the cake of the rare earth hydroxide particles with deionized water until the washing has an electric conductivity not exceeding 3 mS/cm; and (d) dispersing the rare earth hydroxide particles in deionized water as a dispersion medium.

DETAILED DESCRIPTION OF THE PREFERRED EMBODIMENTS

Figure 1:
FIG. 1 is a transmission electron microscopic photograph of the holmium hydroxide particles in the aqueous slurry prepared in Example 1.
Figure 2:
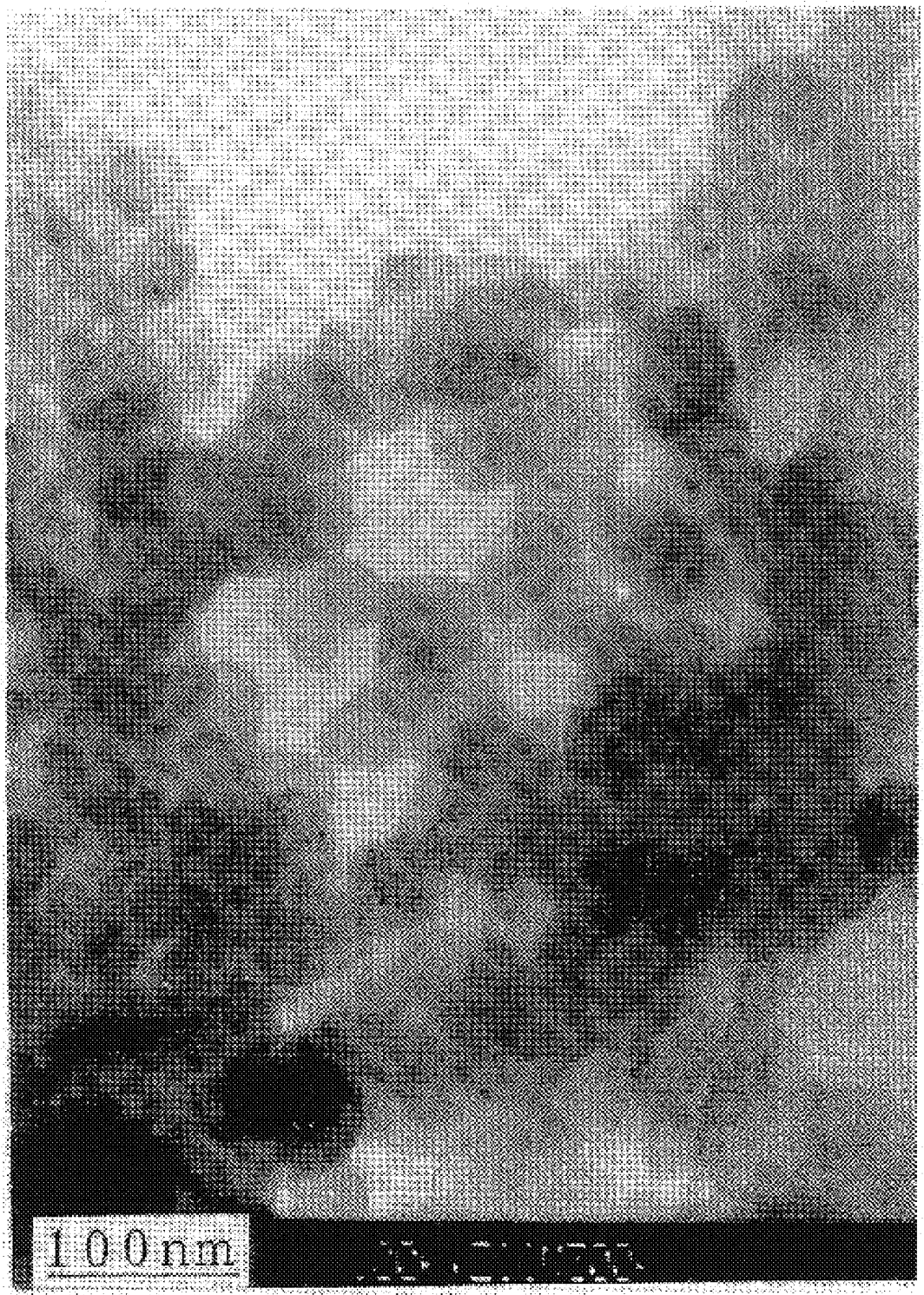
FIG. 2 is a transmission electron microscopic photograph of holmium hydroxide particles for the same view field as in Photo 1 in a larger magnification.

The above defined inventive method for the preparation of an aqueous slurry of rare earth hydroxide particles is applicable to any rare earth element including yttrium and the elements having an atomic number in the range from 57 to 71 without particular limitations.

The rare earth compound used as the starting material in step (a) of the inventive method is not particularly limitative provided that the compound has good solubility in water including chlorides, sulfates, nitrates, aliphatic ammonium salts, salts of sulfate esters, salts of phosphate esters, sulfonates, carboxylates and ether compounds, of which salts with an inorganic acid, i.e. hydrochloric, sulfuric and nitric acids, are preferable and nitrates are more preferable.

The precipitation reaction of the rare earth hydroxide particles by mixing an aqueous solution of the rare earth compound and an aqueous solution of a basic compound is conducted optionally but preferably in the presence of a surface active agent which can be contained in either of the aqueous solutions to be mixed together although it is preferable that the surface active agent is contained in the aqueous solution of the rare earth compound. The surface active agent used here is not particularly limitative relative to the ionic nature thereof including cationic, anionic, non-ionic and amphoteric surface active agents without particular problems.

The cationic surface active agent mentioned above is exemplified by quaternary ammonium compounds such as long chain-alkyl trimethylammonium chlorides and the like. The anionic surface active agent is exemplified by sodium alkylbenzenesulfonates, sodium laurylsulfate, sodium lauryl ether sulfate and the like. The non-ionic surface active agent is exemplified by polyoxyalkylene alkyl ethers, e.g., polyoxyethylene alkyl ethers, and polyoxyalkylene alkylphenyl ethers, e.g., polyoxyethylene nonylphenyl ether. The amphoteric surface active agent is exemplified by betaine lauryl dimethylamino acetate.

Although the ionic nature of the surface active agent is not particularly limitative as is mentioned above, it is preferable to use a cationic surface active agent in respect of the high effectiveness. Various commercial products of cationic surface active agents are available and can be used in the inventive method including those sold under the trade names of Armac C (a product by Lion Akzo Co.), which is an alkyl amine salt-type surface active agent. The amount of the surface active agent contained in the aqueous solution or solutions is in the range from 0.01 to 10 g or, preferably, from 0.1 to 10 g or, more preferably, from 0.5 to 5 g per mole of the rare earth element in the rare earth compound. When the amount of the surface active agent is too small, the desired effects to be obtained thereby cannot be fully accomplished as a matter of course while no further advantages can be obtained by increasing the amount thereof to exceed the above mentioned upper limit.

The basic compound, of which an aqueous solution is mixed together with the aqueous solution of the rare earth compound in step (a) of the inventive method, is also not particularly limitative but is preferably an inorganic hydroxide such as sodium hydroxide, potassium hydroxide and ammonium hydroxide, i.e. ammonia water, of which ammonia water is preferred.

The first aqueous solution, which contains the rare earth compound, and the second aqueous solution, which contains the basic compound, can be mixed together in different ways including (1) addition of the second solution to the first solution, (2) addition of the first solution to the second solution and (3) concurrent addition of the first and second solutions to a volume of water as a receiving bath. The surface active agent can be dissolved in either one, two or all of the first solution, the second solution and the receiving bath, when used.

The concentrations of the rare earth compound and the basic compound in the respective solutions to be mixed together in step (a) of the inventive method should be selected in such a way that the aqueous slurry of the rare earth hydroxide particles formed by the admixture of the solutions contains the hydroxide particles in an amount not exceeding 0.2 mole per liter. This is because, when the content of the hydroxide particles in the aqueous slurry is too high, the aqueous slurry exhibits gel-like consistency so that difficulties are encountered in agitation of the slurry with a stirrer.

The amount of the basic compound contained in the above mentioned second aqueous solution should be sufficient to completely precipitate the rare earth element in the form of a hydroxide of the element or, preferably, in the range from 1.0 to 1.5 times of the stoichiometrically equivalent amount for complete precipitation. When the amount of the basic compound is too small, a portion of the rare earth element remains unprecipitated and is contained in the precipitation medium resulting in an economical disadvantage due to a decrease in the yield of the hydroxide particles while no further improvement can be obtained in the yield of the hydroxide particles even by increase the amount of the basic compound to exceed the above mentioned upper limit resulting also in an economical disadvantage.

The reaction temperature for the precipitation reaction of the rare earth hydroxide particles is not particularly limitative but, preferably, should not be higher than 50° C. or, more preferably, should be room temperature or lower. When the reaction temperature is too high, a disadvantageous increase is caused in the diameter of the primary particles of the hydroxide precipitates formed by the reaction.

The mixing rate of the two aqueous solutions in step (a) of the inventive method is also not particularly limitative and can be selected in such a way that the mixing procedure of the solutions is completed within several minutes under agitation. It is optional that the aqueous slurry of the rare earth hydroxide particles formed by the reaction is continuedly agitated for several minutes after completion of the admixture of the solutions to effect so-called aging of the precipitates.

The precipitates of the rare earth hydroxide thus formed in the precipitation medium are then, in step (b), collected by separating from the precipitation medium in a known solid-liquid separating method such as centrifugation and filtration to give a cake of the precipitates.

In step (c) of the inventive method, the cake of the rare earth hydroxide particles is washed with deionized water to remove the electrolytes adhering to or contained in the hydroxide particles as completely as possible, if necessary, by repeating washing which can be carried out by a known procedure without particular limitations. It is essential that the procedure of washing with water is continued or repeated until the washing separated from the precipitates has an electric conductivity of 3 mS/cm or lower followed by recovery of the hydroxide cake. If the washing procedure is terminated before the electric conductivity of the washing decreases to 3 mS/cm, the hydroxide particles eventually exhibit strong agglomeration to adversely affect the dispersibility of the particles in an aqueous medium.

The last step of the inventive method for the preparation of an aqueous slurry of the rare earth hydroxide particles is for dispersion of the above obtained wet cake of the rare earth hydroxide particles in deionized water by a known procedure in which, for example, the wet cake is introduced into an appropriate volume of deionized water contained in an agitation tank and vigorously agitated therein by using a suitable stirrer machine to be dispersed in the form of an aqueous slurry. Homogenizers are preferred as the stirrer machine when an aqueous slurry of high dispersion should be obtained within a short time. The content of the rare earth hydroxide particles in the aqueous slurry is desirably selected, though dependent on the particularly intended application of the aqueous slurry, in the range from 1 to 20% by weight or, preferably, from 5 to 20% by weight calculated as the rare earth oxide. When the amount of the hydroxide particles is too large relative to the amount of the water as the dispersion medium, dispersion of the particles is sometimes in complete resulting in an inhomogeneous aqueous slurry while, when the amount of the hydroxide particles is too small, an economical disadvantage is caused due to the unduly large volume of the aqueous slurry under handling. When the cake of the rare earth hydroxide particles has been fully washed as specified above in terms of the electric conductivity of the washing, the thus obtained aqueous slurry of the hydroxide particles usually has an electric conductivity not exceeding 2 mS/cm.

The rare earth hydroxide slurry prepared in the above described manner can be used as a component or as a sintering aid of a ceramic molding composition since the rare earth hydroxide particles in the aqueous slurry have good dispersibility with particles of other ceramic materials such as silicon nitride, aluminum nitride, zirconia, barium titanate and others to give a very uniform ceramic molding composition which is molded and subjected to sintering at a temperature of, for example, 600 to 1600° C. or higher to give a sintered ceramic body having a high sintering density and a very uniform and dense structure. It is desirable here that the particles of the base ceramic material, to which the rare earth hydroxide slurry of the invention is added, has an average particle diameter not exceeding 1 $\mu$m in order to fully accomplish the advantage to be obtained by the addition of the inventive aqueous slurry of the rare earth hydroxide particles having good dispersibility for the fineness of the particle size.

The adding amount of the inventive aqueous slurry of the rare earth hydroxide as a sintering aid of a ceramic composition should be selected depending on the types of the base ceramic material. When silicon nitride or aluminum nitride is employed as the base ceramic material, for example, the adding amount of the inventive aqueous slurry is in the range from 0.1 to 20% by weight or, preferably, from 0.5 to 10% by weight calculated as the rare earth oxide based on the total amount of the ceramic molding composition.

In the following, particular embodiments of the present invention are described in more detail by way of Examples, which, however, never limit the scope of the invention in any way.

EXAMPLE 1

Precipitates of holmium hydroxide were formed in a reactor of 200 liter capacity by introducing, into 100 liters of deionized water contained in the reactor, 2.5 liters of a 2.0 moles/liter aqueous solution of holmium nitrate and 5 g of an alkylamine salt-based cationic surface active agent (Armac C, supra) followed by further introduction of 1.1 liters of 15 moles/liter ammonia water under agitation taking 1 minute.

The aqueous slurry of holmium hydroxide precipitates as formed in the reactor had an electric conductivity of 11.9 mS/cm. The precipitates of holmium hydroxide were separated from the precipitation medium by using a centrifugation machine and washed therein repeatedly with deionized water until the electric conductivity of the washing had decreased not to exceed 3 mS/cm. Measurement of the electric conductivity of the slurry and washings was conducted by using an electric conductivity meter Model B-173 manufactured by HORIBA Co. at room temperature.

By continuing centrifugation for additional 1 hour to effect thorough draining, 3050 g of a wet cake of holmium hydroxide particles could be recovered corresponding to 931 g of holmium oxide.

In the next place, a 3000 g portion of the holmium hydroxide cake was introduced into 6 liters of deionized water contained in an agitation tank of 10 liter capacity and the holmium hydroxide particles were dispersed in water by driving the stirrer for 4 hours to give an aqueous slurry of holmium hydroxide particles in a content of 10.1% by weight calculated as holmium oxide. The aqueous slurry had an electric conductivity of 0.62 mS/cm.

The aqueous slurry of holmium hydroxide particles was electron microscopically examined by taking transmission electron microscopic photographs shown in Photos 1 and 2 of the accompanying drawing for inspection of the state of dispersion and for determination of the average primary particle diameter of the hydroxide particles. The magnification setting in taking Photo 1 and Photo 2 was 50000 times magnification and 250000 times magnification, respectively, for the same view field. As estimated from Photos 1 and 2, the average diameter of the primary particles in the holmium hydroxide did not exceed 100 nm.

With an object to examine the stability of the aqueous slurry against settling of the holmium hydroxide particles, a 100 g portion of the slurry taken in a cylindrical glass vessel of 50 mm inner diameter was kept standing at room temperature for 30 days and then discharged therefrom by turning the vessel upside-down. The holmium hydroxide particles deposited on and adhering to the bottom of the vessel were dissolved out with nitric acid and the solution was quantitatively analyzed for the amount of holmium to find that the amount of the deposited holmium hydroxide particles was only 0.2% of the overall amount of the holmium hydroxide particles contained in the aqueous slurry taken in the cylindrical vessel indicating that the aqueous slurry had excellent stability against settling of the hydroxide particles.

A ceramic molding composition was prepared by blending, in a ball mill of a plastic resin for 24 hours, 92 g of a powder of silicon nitride $Si_3N_4$ having an average particle diameter of 0.9 µm, 3 g of an alumina powder having an average particle diameter of 0.9 µm and 49.5 g of the above prepared aqueous slurry of holmium hydroxide particles corresponding to 5 g of holmium oxide with addition of an appropriate volume of water as a blending medium followed by drying of the slurry, disintegration of the dried blend and screening of the powder through a screen of 100 mesh fineness. A metal mold was filled with the thus prepared ceramic molding powder which was compression-molded therein under a pressure of 29.42 MPa or 300 kgf/cm$^2$ into a pellet-formed powder compact having a diameter of 20 mm and a height of about 10 mm, which was wrapped with a rubber sheet and hydrostatically compressed under an isotropic pressure of 117.7 MPa or 1200 kgf/cm$^2$. The thus obtained powder compact as a green body for sintering was subjected to sintering by heating in an atmosphere of nitrogen gas at a temperature of 1850° C. for 8 hours to give a highly densified sintered ceramic body having a relative density of 99.3% as determined by the Archimedes method.

EXAMPLE 2

An aqueous slurry of dysprosium hydroxide was prepared in a reactor of 200 liter capacity by introducing, into 100 liters of water contained therein, 2.5 liters of a 2.0 moles/liter aqueous solution of dysprosium nitrate and 10 g of the same surface active agent as used in Example 1 followed by further introduction of 1.1 liters of a 15 moles/liter ammonia water under agitation taking 1 minute. The thus formed aqueous slurry of dysprosium hydroxide particles had an electric conductivity of 12.8 mS/cm.

The aqueous slurry was subjected to centrifugal separation in a centrifugation machine to give a cake of the dysprosium hydroxide which was repeatedly washed therein with deionized water until the electric conductivity of the washing had decreased not to exceed 3 mS/cm followed by further continued driving of the centrifugation machine for additional 1 hour to effect full draining of the cake to recover 3046 g of the dysprosium hydroxide cake corresponding to 920 g of dysprosium oxide.

In the next place, a 3000 g portion of the above obtained dysprosium hydroxide cake was added to 6 liters of deionized water contained in an agitation tank of 10 liter capacity and dispersed in the deionized water by agitating 4 hours to give an aqueous slurry of dysprosium hydroxide particles having an electric conductivity of 1.33 mS/cm, of which the content of the dysprosium hydroxide was 10.2% by weight calculated as dysprosium oxide.

According to the results of the transmission electron microscopic studies of the thus obtained aqueous slurry, the average diameter of the primary particles of the dysprosium hydroxide did not exceed about 100 nm. The stability of the aqueous slurry against settling of the dysprosium hydroxide particles was examined in the same manner as in Example 1 to find that the amount of the dysprosium hydroxide particles deposited on the bottom of the cylindrical vessel was only 0.1% by weight calculated as dysprosium oxide.

COMPARATIVE EXAMPLE 1

An aqueous slurry of holmium hydroxide particles was prepared in about the same manner as in Example 1 except that the holmium hydroxide cake centrifugally separated from the precipitation medium was dispersed as such in 6 liters of deionized water without undertaking repeated washing with deionized water to remove the electrolytes. The thus prepared aqueous slurry had an electric conductivity of 3.2 mS/cm and the content of holmium hydroxide particles therein was 10.2% by weight calculated as holmium oxide.

COMPARATIVE EXAMPLE 2

A ceramic molding composition was prepared by blending, in a ball mill of a plastic resin for 24 hours, 92 g of the same silicon nitrate powder as used in Example 1, 5 g of a holmium oxide powder having an average particle diameter of 1.1 $\mu$m and 3 g of the same alumina powder as used in Example 1 with addition of an appropriate volume of water as a blending medium. The thus prepared ceramic molding composition in the form of an aqueous slurry was processed in just the same manner as in Example 1 to give a sintered ceramic body, which, however, had a relative density of 97.8% to be definitely lower than in Example 1.

EXAMPLE 3

An aqueous slurry of holmium hydroxide particles was prepared in substantially the same manner as in Example 1 except that the precipitation reaction of holmium hydroxide was conducted at a liquid temperature of 40° C. instead of room temperature. The thus prepared aqueous slurry containing 10.3% by weight of the holmium hydroxide particles calculated as holmium oxide had an electric conductivity of 1.10 mS/cm at room temperature and the primary particles of holmium hydroxide had a maximum diameter of 130 nm.

What is claimed is:

1. An aqueous slurry of particles of a rare earth hydroxide, of which the primary particles of the rare earth hydroxide have a particle diameter not exceeding 150 nm, having an electric conductivity not exceeding 2 mS/cm at room temperature, said slurry produced by a process which comprises the steps of:
   (a) mixing an aqueous solution of a water-soluble rare earth compound and an aqueous solution of a basic compound to precipitate rare earth hydroxide particles in an aqueous precipitation medium;
   (b) collecting the rare earth hydroxide particles by separating from the aqueous precipitation medium to give a cake of the rare earth hydroxide particles;
   (c) repeatedly washing the cake of the rare earth hydroxide particles with deionized water until the washing has an electric conductivity not exceeding 3 mS/cm at room temperature; and
   (d) dispersing the rare earth hydroxide particles in deionized water as a dispersion medium to give an aqueous slurry.

2. The aqueous slurry of particles of a rare earth hydroxide as claimed in claim 1 of which the content of the rare earth hydroxide particles is in the range from 1 to 20% by weight calculated as the rare earth oxide.

3. The aqueous slurry of particles of a rare earth hydroxide as claimed in claim 2 of which the content of the rare earth hydroxide particles is in the range from 5 to 20% by weight calculated as the rare earth oxide.

4. The aqueous slurry of particles of a rare earth hydroxide as claimed in claim 1 in which mixing of an aqueous solution of a water-soluble rare earth compound and an aqueous solution of a basic compound in step (a) is conducted in the presence of a surface active agent.

5. The aqueous slurry of particles of a rare earth hydroxide as claimed in claim 4 in which the surface active agent is a cationic surface active agent.

6. The aqueous slurry of particles of a rare earth hydroxide as claimed in claim 5 in which the cationic surface active agent is an alkylamine salt compound.

7. The aqueous slurry of particles of a rare earth hydroxide as claimed in claim 4 in which the amount of the surface active agent is in the range from 0.01 to 10 g per mole of the rare earth element in the water-soluble rare earth compound.

8. The aqueous slurry of particles of a rare earth hydroxide as claimed in claim 1 in which the water-soluble rare earth compound is a nitrate of the rare earth element.

9. The aqueous slurry of particles of a rare earth hydroxide as claimed in claim 1 in which the aqueous solution of a basic compound is ammonia water.

10. The aqueous slurry of particles of a rare earth hydroxide as claimed in claim 1 in which the volumes of the aqueous solutions of the water-soluble rare earth compound and the basic compound in step (a) are such that the amount of the rare earth hydroxide particles in the precipitation medium does not exceed 0.2 mole per liter.

11. The aqueous slurry of particles of a rare earth hydroxide as claimed in claim 1 in which the volume of the deionized water in step (d) is such that the content of the rare earth hydroxide particles in the aqueous slurry is in the range from 1 to 20% by weight calculated as rare earth oxide.

* * * * *